(12) United States Patent
Albert et al.

(10) Patent No.: US 10,707,003 B2
(45) Date of Patent: Jul. 7, 2020

(54) ELECTRICAL CONNECTION DEVICE

(71) Applicant: Daimler AG, Stuttgart (DE)

(72) Inventors: Simone Albert, Neidlingen (DE);
Fabian Gall, Albstadt (DE);
Alessandro Lonati, Botticino (IT);
Renato Santulli, Brescia (IT)

(73) Assignee: Daimler AG, Stuttgart (DE)

(*) Notice: Subject to any disclaimer, the term of this patent is extended or adjusted under 35 U.S.C. 154(b) by 67 days.

(21) Appl. No.: 15/778,170

(22) PCT Filed: Oct. 25, 2016

(86) PCT No.: PCT/EP2016/001766
§ 371 (c)(1),
(2) Date: May 22, 2018

(87) PCT Pub. No.: WO2017/088945
PCT Pub. Date: Jun. 1, 2017

(65) Prior Publication Data
US 2018/0286552 A1    Oct. 4, 2018

(30) Foreign Application Priority Data
Nov. 24, 2015 (DE) .................. 10 2015 015 243

(51) Int. Cl.
*F16K 31/06* (2006.01)
*H01F 7/127* (2006.01)
(Continued)

(52) U.S. Cl.
CPC .............. *H01F 7/127* (2013.01); *F16K 1/30* (2013.01); *F16K 31/06* (2013.01); *F17C 2205/0134* (2013.01); *F17C 2205/0326* (2013.01); *F17C 2205/0385* (2013.01); *F17C 2205/0394* (2013.01); *F17C 2221/012* (2013.01); *F17C 2221/033* (2013.01);
(Continued)

(58) Field of Classification Search
CPC ................ F16K 31/02; F16K 31/0675; F17C 2205/0326; F17C 2250/0439
USPC ...................................... 251/129.01–129.22
See application file for complete search history.

(56) References Cited

U.S. PATENT DOCUMENTS

| 2010/0032934 A1 | 2/2010 | Veenstra |
| 2015/0147912 A1 | 5/2015 | Lutz et al. |
| 2015/0179326 A1 | 6/2015 | Shimizu |

FOREIGN PATENT DOCUMENTS

| CN | 101213630 A | 7/2008 |
| CN | 103322266 A | 9/2013 |

(Continued)

OTHER PUBLICATIONS

PCT/EP2016/001766, International Search Report dated Jan. 25, 2017 (Three (3) pages).
(Continued)

*Primary Examiner* — Ramon M Barrera
(74) *Attorney, Agent, or Firm* — Crowell & Moring LLP

(57) ABSTRACT

An electrical connection device for an electromagnetic valve that has a temperature sensor for sensing the temperature of a medium. The electrical connection device includes an electrical contact plug. The electrical contact plug is part of a common housing which additionally includes an actuator coil for the electromagnetic valve as well as a plug contact for making electrical contact with the temperature sensor when the housing is mounted onto the electromagnetic valve.

10 Claims, 2 Drawing Sheets

(51) Int. Cl.
*F16K 1/30* (2006.01)
*H01F 7/06* (2006.01)

(52) U.S. Cl.
CPC .............. *F17C 2223/0123* (2013.01); *F17C 2223/036* (2013.01); *F17C 2250/0439* (2013.01); *F17C 2270/0178* (2013.01); *H01F 2007/062* (2013.01); *Y02E 60/321* (2013.01)

(56) References Cited

FOREIGN PATENT DOCUMENTS

| | | |
|---|---|---|
| CN | 104682125 A | 6/2015 |
| DE | 10 2013 019 879 A1 | 5/2015 |
| DE | 10 2014 002 660 A1 | 8/2015 |
| EP | 2 520 848 A2 | 11/2012 |
| EP | 2 535 626 A1 | 12/2012 |
| JP | 2007-139116 A | 6/2007 |
| WO | WO 2015/129159 A1 | 9/2015 |

OTHER PUBLICATIONS

Chinese Office Action issued in Chinese counterpart application No. 201680067929.3 dated Sep. 2, 2019, with partial English translation (Nine (9) pages).

ELECTRICAL CONNECTION DEVICE

BACKGROUND AND SUMMARY OF THE INVENTION

The invention relates to an electrical connection device comprising a contact plug. The invention further relates to an electromagnetic valve comprising a temperature sensor and an electrical connection device of this kind. The invention further relates to the use of an electromagnetic valve of this kind.

Electromagnetic valves comprising a temperature sensor are known from the prior art and are used for example in pressurized gas containers in order to both detect the temperature of the medium in the pressurized gas container and to control the withdrawal of the medium from the pressurized gas container using the electromagnetic valve for example. By way of example, reference can be made in this connection to DE 10 2014 002 660 A1, which describes a structure of this kind.

In practice, it is now the case that the cabling and connection between the temperature sensor and the electromagnetic valve or the actuator coil thereof is relatively complex, and this makes the structure very complex in terms of the electrics when maintenance is required.

The object of the present invention is that of specifying an electrical connection device for an electromagnetic valve, and an electromagnetic valve, which prevents the disadvantages mentioned and allows for simple and reliable mounting.

In the case of the electrical connection device according to the invention for an electromagnetic valve comprising a temperature sensor for detecting a temperature of a medium, the electrical contact plug is part of a housing which furthermore comprises an actuator coil for the valve and a plug contact for electrically contacting the temperature sensor when the housing is mounted on the valve. The electrical connection device therefore substantially consists of a housing which comprises a contact plug in order, for example, to ensure contact with an electrical connection line, in particular a wiring harness in the case of application in a vehicle. In this case, the contact plug allows for contacting that is very simple, and therefore less susceptible to faults, with regard to mounting. The electrical connection device itself directly comprises the actuator coil for the electromagnetic valve, and therefore the coil can also be mounted together with the housing and does not need to be mounted separately and connected. Moreover, the electrical connection device comprises a plug contact that is contacted by the temperature sensor when mounted. In this case, the temperature sensor is mounted for example as described in DE 10 2014 002 660 A1, mentioned at the outset. The sensor is accessible from the rear, from the side of the electromagnetic valve means remote from the pressurized medium, via a hole, when the valve means is used as a tank valve in a pressurized gas container. This makes mounting and electrical contacting extremely complex in the case of the conventional structures. The electrical connection device according to the invention allows the temperature sensor to be contacted very easily by the plug contact when the connection device is mounted, for example in that the plug contact is designed to extend through a hole, as far as the temperature sensor or the electrical terminals thereof. Simply placing on the electrical connection device, comprising the integrated coil, and the contacting of the electrical temperature sensor established when the connection device is placed on, makes it possible to connect all the necessary electrical terminals. This makes mounting extremely simple, efficient and fault-tolerant.

In this case, according to an advantageous development of the concept, the plug contact, as well as the coil, is connected to the contact plug, and therefore the further connection, for example connection to a wiring harness for actuating the electromagnetic valve and for evaluating the temperature data, can be achieved by this one contact plug.

The object according to the invention is also achieved by an electromagnetic valve comprising a temperature sensor and an electrical connection device of this kind according to the invention. In an advantageous development of the electromagnetic valve means according to the invention, the temperature sensor and/or the receptacle thereof in the valve has a marking for angularly precise mounting. A marking of this kind for angularly precise mounting of the temperature sensor makes it very easy to reliably mount the above-described electrical connection device according to the invention. The angularly precise alignment of the temperature sensor means that the electrical contacts of the sensor are also aligned in an angularly precise manner without it being necessary to use specifically designed contacts, such as annular contacts, here. Instead, sufficiently precise interaction with the mating contacts in the plug contact can be achieved by angularly precise mounting of the temperature sensor, with the result that the mounting and structure of the electrical connection device according to the invention is further simplified thereby.

It may also be possible for the electrical connection device to be connected to the valve by one releasable connection means. A connection means of this kind may in particular be a screw that is arranged axially and centrally in the region of the coil. After the electrical connection device has been plugged in, during which process the temperature sensor is contacted by the plug contact, the connection device can be secured on the valve by means of inserting a screw at the upper end, for example in the region of the electrical magnetic coil, in order to connect the connection device to a suitable mating element. The positioning of the electromagnetic coil in the required position and the electrical contacting of the temperature sensor can then be achieved by the one screw. The structure prepared in this way can then be further contacted by the contact plug in an extremely simple and efficient manner, the transmission of all necessary power and/or data being ensured in the contact plug by means of a sufficient number of terminals.

Furthermore, according to an advantageous development of the concept, in the electromagnetic valve according to the invention, the plug contact of the connection device and the temperature sensor may extend at an angle of 90° relative to one another. This allows the components to be contacted not so as to be flush with one another, but instead so as to be at an angle to one another, and, with regard to mounting, this can be achieved extremely simply and relatively reliably, even at high component tolerances, if the electrical contacts are sufficiently flexible and of a sufficient size.

The electromagnetic valve comprising a temperature sensor, and the possibility of mounting the valve extremely simply and efficiently using the electrical connection device, is suitable in particular for use in applications that require correspondingly large numbers of parts. The valve can therefore preferably be used in particular in the field of tank valves of pressurized gas containers, in particular when the pressurized gas containers are used for storing fuel in the form of compressed natural gas or compressed hydrogen in vehicles.

Further advantageous embodiments of the electrical connection device according to the invention and of the electromagnetic valve according to the invention are apparent from the rest of the dependent claims and are made clear with reference to the embodiment which is described in greater detail below with reference to the drawings.

DETAILED DESCRIPTION OF THE DRAWINGS

Figure 1:
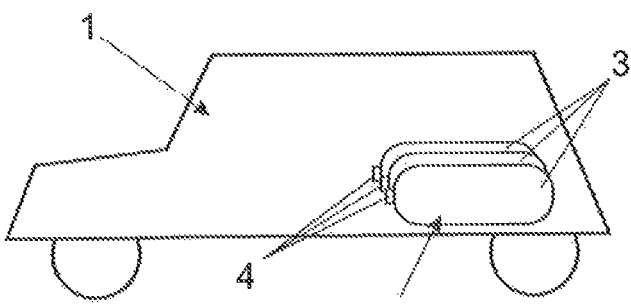
FIG. 1 schematically shows a vehicle comprising a pressurized gas container.
Figure 2:
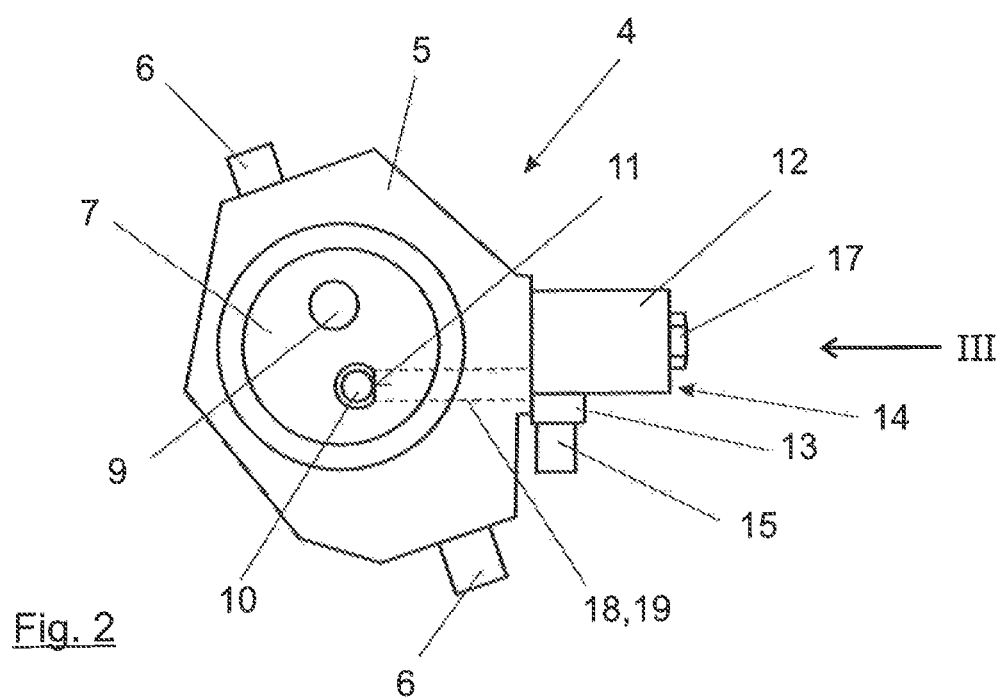
FIG. 2 is a view of an electromagnetic valve in an embodiment as a tank valve for the pressurized gas container.
Figure 3:
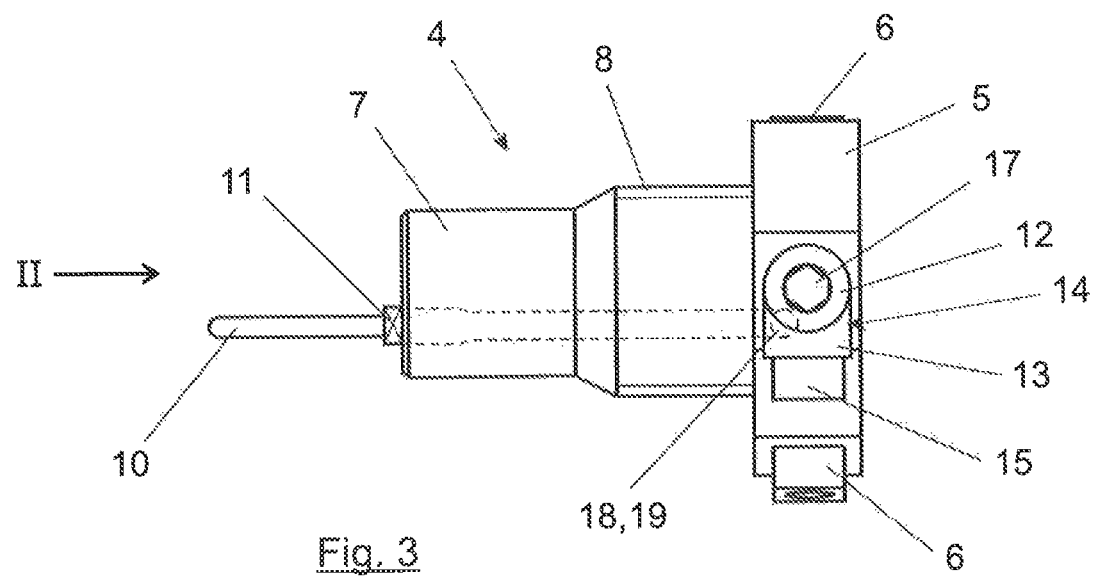
FIG. 3 is a view of the same valve see from the viewing direction III in FIG. 2.

FIG. 1 shows a vehicle 1, purely by way of example. The vehicle is intended to be driven by means of a gaseous fuel, such as compressed natural gas or compressed hydrogen. The fuel can be converted into driving power for example in an internal combustion engine or in particular also in a fuel cell system in the case of hydrogen. In this case, a storage means 2 is provided in the vehicle 1 for storing the compressed gas, for example hydrogen at a nominal pressure of 70 MPa. The storage means 2 typical comprises a plurality of individual pressurized gas containers 3, which are indicated in FIG. 1. Each of the pressurized gas containers 3 comprises a tank valve 4 that is connected thereto and is also referred to as an OTV (On Tank Valve). FIGS. 2 and 3 show a design, by way of example, of a tank valve of this kind. The tank valve 4 is designed as an electromagnetic tank valve 4. The valve can be formed as what is known as a pilot valve for example, which valve is known in principle from the prior art and is described, by way of example, in DE 10 2013 019 879 A1 by the Applicant.

FIG. 2 shows r tank valve 4 of this kind from the viewing direction of the pressurized gas container 3, but without showing the container. The tank valve 4 comprises a valve housing 5 on which two connections, denoted by 6, for example for supplying and removing gas, are indicated by way of example. In this case, a region denoted by 7 can be seen in the center of the tank valve 4, which region projects into the pressurized gas container 3 when the tank valve 4 is mounted. This structure can be seen more clearly in FIG. 3, which is a side view from the direction of the arrow denoted III in FIG. 2. The region 7 that protrudes towards the pressurized gas container further comprises a thread that is denoted by 8 and is indicated in FIG. 3. The tank valve 4 is screwed to the corresponding receptacle, typically referred to as BOSS, of the pressurized gas container 3 by means of the thread 8.

As can again be seen in FIG. 2, the region 7 comprises a communication connection which is denoted by 9 and via which the gas can flow into the pressurized gas container and out of the pressurized gas container to the tank valve 4, temperature sensor 10 is furthermore provided. The temperature sensor is formed in a manner known per se, and for example in the manner as described by DE 10 2014 002 660 A1, mentioned at the outset, and comprises a casing that surrounds the sensor element itself, for example an NTC resistor. The temperature sensor 10, together with the casing thereof, can be screwed to the region 7 for example. The temperature sensor in particular comprises a surface 11 which can be seen in FIG. 2 and is also indicated as a surface by a cross in FIG. 3. This allows for angular alignment of the temperature sensor 10 during mounting, which alignment may also be expedient for the reasons described below.

Figure 4:
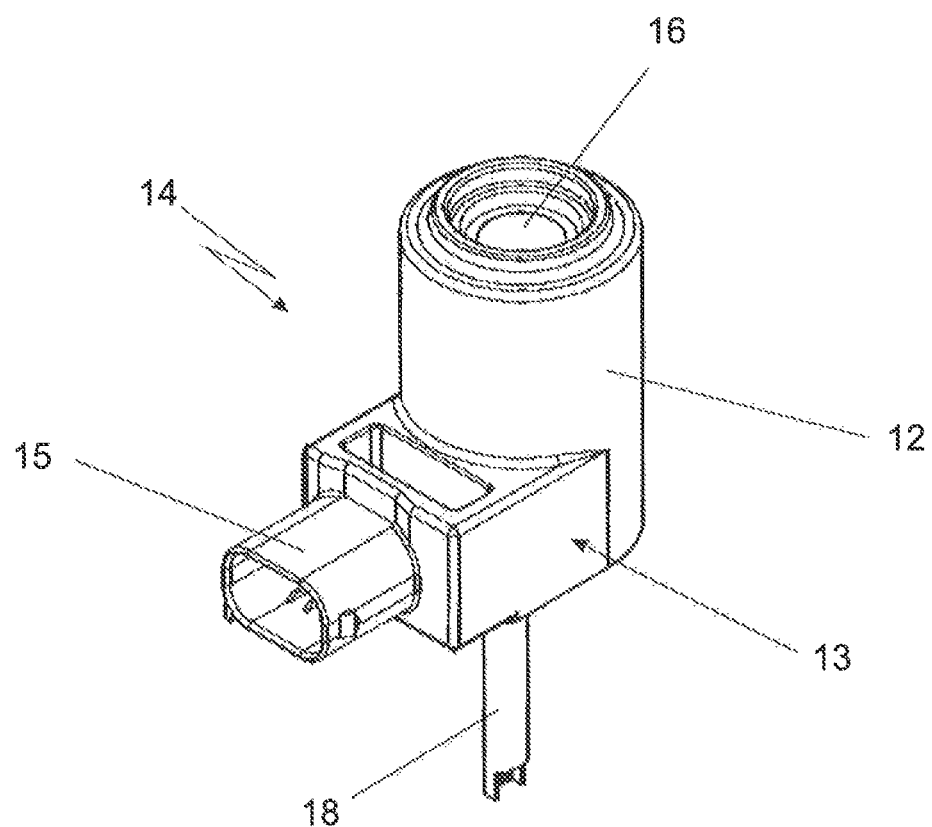
FIG. 4 is a three-dimensional view of a possible embodiment of an electrical connection device according to the invention.

For the purpose of actuating the electromagnetically activated valve 4, the valve comprises an electromagnetic coil 12 as the actuator, which coil can be seen very clearly in particular in FIG. 2. The coil is located in a housing 13 of an electrical connection device that is denoted in its entirety by 14. In addition to the coil 12, the connection device also comprises a contact plug 15 as a further part of the housing 13, by means of which contact plug a connection for example to a wiring harness of the vehicle 1 can be established in order to thus activate the electromagnetic coil 12 as the actuator coil of the tank valve 4. FIG. 4 is a three-dimensional view, by way of example, of the overall structure of the electrical connection device 14. The housing, denoted in its entirety by 13, comprises the actuator coil 12, in particular so as to be sealed in the housing 13. The contact plug 15 is also visible. The plug extends substantially at right-angles to the central axis of the actuator coil 12. In order to mount the actuator coil 12, a screw, denoted by 17 in FIGS. 2 and 3, can be guided through a central opening, denoted by 16 in FIG. 4, in the actuator coil 12 in order to thus screw the electrical connection device 14 to the valve housing 5. The actuator coil 12 can then interact, in the desired manner, with the corresponding parts of the pilot valve in the valve housing 5 for example.

As can be seen in FIG. 4, the electrical connection device 14 further comprises a plug contact denoted by 18. The contact extends in parallel with the axis of the actuator coil 12 and, when the electrical connection device 14 is mounted, extends into the valve housing 5. This is indicated by the dashed line in FIG. 2. For this purpose, the valve housing 5 comprises a suitable opening 19 into which the plug contact 18 can project.

FIG. 3 furthermore shows that the temperature sensor 10 projects through the entire region 7 of the tank valve 4, for example again analogously to the DE document mentioned at the outset. The temperature sensor generally comprises corresponding connection elements at the end thereof facing the valve housing 5, which elements are not visible here. The temperature sensor ends in the region of the opening 19 for the plug contact 18. If the electrical connection element 14 is now mounted on the valve housing 5, the plug contact 18 then projects into the valve housing 5 and comes into electrically connecting engagement with the temperature sensor 10 or with the plug contacts thereof facing the valve housing 5. In order to safely and reliably ensure the contacting, which is typically achieved by plugging together the plug contact 18 and the temperature sensor 10 at right-angles, it is important, as already mentioned at the outset, that the angular alignment of the temperature sensor 10 is correct. Various measures and markings could be provided for this purpose. In the embodiment shown here, this is achieved by means of the surface denoted 11, which surface is aligned so as to extend for example in parallel with the edge of the valve housing 5 on which the electrical connection device 14 is mounted.

Thus, when the temperature sensor 10 is mounted, the temperature sensor 10 can be contacted by the plug contact 18, and thus ultimately with the contact plug 15 of the electrical connection device 14, by simply plugging in the electrical connection device 14. The actuator coil 12 is also connected to further poles of the contact plug 15 inside the electrical connection device 14. It is therefore sufficient to plug in the electrical connection device 14 in order to achieve the corresponding contacting. Subsequently, as already mentioned, the connection device can be secured by the screw 17. The electrical connection device 14 thus makes it possible to extremely easily electrically contact the tank valve 4 and to ensure the necessary electrical connections to the contact plug 15 during installation or mounting. A connector plug on the wiring harness of the vehicle 1 can then establish contact between the contact plug 15 and the corresponding control devices, in order to ensure reliable functionality of the tank valve 4 and evaluation of the temperature signal.

The invention claimed is:

1. An electrical connection device for an electromagnetic valve, wherein the electromagnetic valve includes a temperature sensor for detecting a temperature of a medium, comprising:
   a housing, wherein the housing includes:
      an electrical contact plug;
      an actuator coil for the electromagnetic valve; and
      a plug contact, wherein the plug contact is electrically contactable with the temperature sensor when the housing is mounted on the electromagnetic valve.

2. The electrical connection device according to claim 1, wherein the plug contact and the actuator coil are electrically connected, in the housing, to poles of the electrical contact plug.

3. The electrical connection device according to claim 1, wherein the plug contact is aligned with or in parallel with a central axis of the actuator coil.

4. The electrical connection device according to claim 1, wherein the electrical contact plug is disposed at an angle of approximately 90° relative to the actuator coil and/or the plug contact.

5. An electromagnetic valve, comprising:
   a temperature sensor; and
   an electrical connection device according to claim 1;
   wherein the electrical connection device is electrically contacted with the temperature sensor.

6. The electromagnetic valve according to claim 5, wherein the temperature sensor and/or a receptacle thereof in a valve housing of the electromagnetic valve has a marking for angularly precise mounting.

7. The electromagnetic valve according to claim 5, wherein the electrical connection device is connected to a valve housing of the electromagnetic valve by one releasable connection means.

8. The electromagnetic valve according to claim 7, wherein the releasable connection means is a screw that is disposed axially and centrally in a region of the actuator coil.

9. The electromagnetic valve according to claim 5, wherein the plug contact of the electrical connection device and the temperature sensor extend at an angle of approximately 90° relative to one another.

10. A method of using an electromagnetic valve according to claim 5, comprising the step of:
    connecting the electromagnetic valve to a pressurized gas container.

* * * * *